United States Patent [19] [11] Patent Number: 4,514,064
Kurosu et al. [45] Date of Patent: Apr. 30, 1985

[54] ELECTROMAGNETIC SHUTTER

[75] Inventors: Tomio Kurosu, Iwatsuki; Yukio Yoshikawa, Tokyo, both of Japan

[73] Assignee: Copal Company Limited, Tokyo, Japan

[21] Appl. No.: 438,617

[22] Filed: Nov. 2, 1982

[30] Foreign Application Priority Data

Nov. 4, 1981 [JP] Japan .................. 56-163696[U]
Nov. 10, 1981 [JP] Japan .................. 56-166618[U]
Nov. 10, 1981 [JP] Japan .................. 56-166619[U]

[51] Int. Cl.$^3$ ............................................. G03B 9/14
[52] U.S. Cl. ............................................. 354/234.1
[58] Field of Search ............... 354/230, 234.1, 235.1, 354/264, 271.1

[56] References Cited

U.S. PATENT DOCUMENTS 4,024,552  5/1977  Kondo ..................... 354/234.1
4,348,092  9/1982  Hirohata et al. ........... 354/234.1

Primary Examiner—John Gonzales
Attorney, Agent, or Firm—McAulay, Fields, Fisher, Goldstein & Nissen

[57] ABSTRACT

The electromagnetic shutter consists of a plurality of shutter sectors made of plastic material, printed electric coils operatively coupled with the shutter sectors, and permanent magnets fixed to the shutter at positions where the permanent magnets cooperate electromagnetically with the printed electric coils, respectively, so that, when electric current is supplied for a predetermined time period to the printed electric coils, electromagnetic force is generated by the printed electric coils so as to open the shutter sectors for the predetermined time period and thereafter closed to complete a required exposure. The printed electric coils are formed on the shutter sectors or on a sector ring coupled with the shutter sectors by vacuum evaporation of metal or by sticking a foil of metal. In order to improve wear-resisting property of the shutter sectors and the sector ring, a wear-resisting layer of the same material as that of the printed electric coils is formed on both surfaces each of the shutter sectors or the sector ring simultaneously with the formation of the printed electric coil(s) by the same forming process. In case the shutter includes a pair of shutter sectors adapted to be moved symmetrically oppositely with respect to the aperture and each having a light receiving window formed therein for allowing the scene light to pass through the aperture when at least a portion of the window is brought in alignment with the aperture, the shutter sector may be formed further with a light intercepting layer of the same material as that of the printed electric coils simultaneously with the formation thereof by one and the same forming process, and, further, a thin light receiving aperture defining layer of the same material as that of the printed electric coils may be formed around the peripheral portion of the aperture which projects slightly inwardly beyond the periphery of the aperture.

20 Claims, 11 Drawing Figures

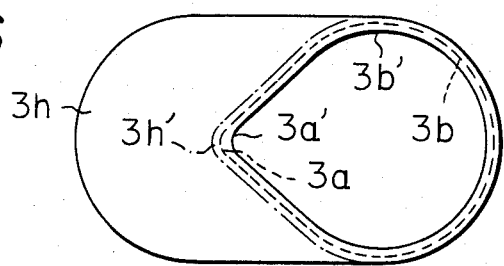
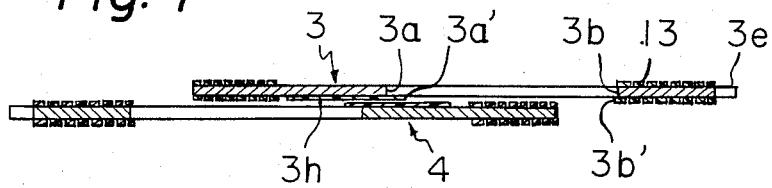
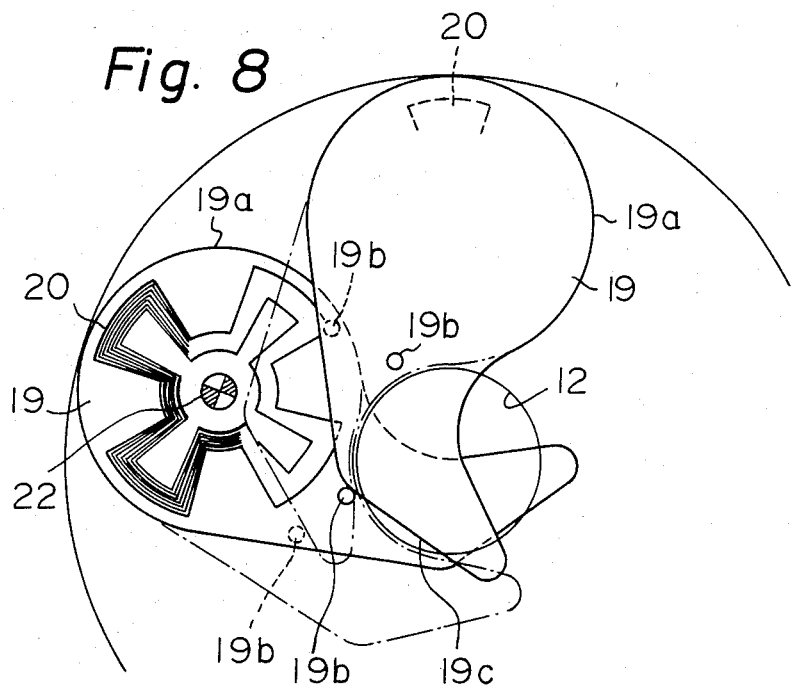

ELECTROMAGNETIC SHUTTER

BACKGROUND OF THE INVENTION

The present invention relates to an electromagnetic shutter and, more particularly, to an electromagnetic shutter having an improved wear-resisting property on the relatively sliding members therein and an improved light intercepting property of the shutter sectors made of a plastic material and, further, having an improved scattered light preventing property caused by the diffused reflection of the scene light directly incident to the inner wall of the light receiving window formed in the shutter sectors made of a plastic material and, hence, having a relatively large thickness.

An electromagnetic shutter comprises, as disclosed in Japanese Patent Public Discl. No. 113620/1976, a sheet-like electric coil embedded intermediate the thickness of each shutter sector made of a plastic material, a permanent magnet stationarily held in the shutter so as to electromagnetically cooperate with each electric coil, so that, when electric current is supplied to the electric coils, electromagnetic force is generated by the electric coils by virtue of the cooperation with the permanent magnets to thereby actuate the shutter sectors for opening or closing the aperture of the shutter or in combination of the electromagnetic force and the force of springs for opening or closing the shutter sectors.

In such an electromagnetic shutter, since the shutter sectors are made of a plastic material, wear-resisting property is relatively low so that the durability of the shutter is deteriorated.

Further, the shutter sectors made of a plastic material suffer from relatively low light intercepting property so that the accurate operation of the shutter for the proper exposure is deteriorated.

Further, since the shutter sectors made of a plastic material have a relatively large thickness to obtain the required mechanical strength, scattered light tends to occur when the scene light is directly incident to the inner wall of a light receiving window formed in each shutter sector for passing the scene light through the aperture of the shutter when at least a portion of the window is brought into alignment with the aperture due to the diffused reflection of the scene light directly incident to the inner wall of the window.

SUMMARY OF THE INVENTION

The present invention aims at avoiding the above described disadvantages of the prior art electromagnetic shutter.

It is, therefore, an object of the present invention to provide a novel and useful electromagnetic shutter which is easy to produce at a lower cost and accurate in operation and has a long durability of the relatively sliding members in the shutter over the prior art electromagnetic shutter.

The other object is to provide a novel and useful electromagnetic shutter of the type described above which has a superior light intercepting property of shutter sectors made of a plastic material for insuring the proper operation of the shutter.

A still further object is to provide a novel and useful electromagnetic shutter of the type described above which positively prevents scattered light from being generated by the diffused reflection of the scene light incident to the shutter sectors in the shutter.

The above object is achieved in accordance with the present invention by the provision of an electromagnetic shutter having an exposure aperture for passing therethrough the scene light, a plurality of shutter sectors made of a plastic material and adapted to be opened from the closed positions intercepting the scene light from passing through the aperture so that the aperture is uncovered to allow the scene light to pass through the aperture and then closed to the closed positions so as to complete an exposure by the shutter, printed electric coil means operatively coupled with the shutter sectors and permanent magnet means located stationarily in the shutter so as to cooperate with the printed electric coil means so that, when electric current is supplied in a predetermined direction to the printed electric coil means for a predetermined time period, electromagnetic force is generated by the printed electric coil means by virtue of the cooperation thereof with the permanent magnet means to cause the shutter sectors to be opened for the predetermined time period and thereafter closed to complete a required exposure, the electromagnetic shutter being characterized in that mechanically relatively sliding portions moved with the shutter sectors are provided with wear-resisting layers made of the same material as that of the printed electric coil means, the layers being formed on the portions at the same time as the printed electric coil means is formed by one and the same forming process, thereby greatly improving the durability of the relatively sliding portions.

The printed electric coil(s) and the wear-resisting layers may be formed by the vacuum evaporation of metal.

Alternatively, the printed electric coil(s) and the wear-resisting layers may be formed by sticking of a foil of metal.

The electromagnetic shutter may be provided with a pair of shutter sectors of substantially the same configuration arranged symmetrically to each other and adapted to be moved symmetrically oppositely with respect to the aperture along a straight line passing through the center of the aperture and each formed with a light receiving window for passing therethrough the scene light when at least a portion of the window is brought in alignment with the aperture, and the printed electric coil is formed on at least a surface each of the shutter sectors and the wear-resisting layer is formed on the peripheral edge portion on both surfaces each of the shutter sectors simultaneously with the formation of the printed electric coil(s).

Alternatively, the electromagnetic shutter may be provided with a plurality of shutter sectors rotatably arranged on a base plate in equally spaced relationship to each other along a circle concentric to the aperture and each of the printed electric coils is formed on at least a surface each of the shutter sectors and the wear-resisting layer is formed on the peripheral edge portion on both surfaces each of the shutter sectors simultaneously with the formation of the printed electric coil(s).

In a further alternative embodiment of the electromagnetic shutter of the present invention, it may comprise a plurality of shutter sectors arranged equally spaced relationship to each other along a circle concentric to the aperture and coupled with a reciprocally rotatable sector ring concentric to the aperture so that the shutter sectors are opened and closed by the reciprocal rotation of the sector ring. In this embodiment, however, the printed electric coil is formed on at least a surface of the sector ring instead of being formed on each shutter sector and the wear-resisting layer is formed on the peripheral edge portion on both surfaces of the sector ring simultaneously with the formation of the printed electric coil(s).

In accordance with a further characteristic feature of the present invention, each of the pair of shutter sectors each having the light receiving window may be provided with a light intercepting layer of the same material as that of the printed electric coil adjacent to the window on the surface of the respective shutter sector simultaneously with the formation of the printed electric coil(s) and the wear-resisting layers by one and the same forming process and being of such a configuration that the same positively intercept the scene light from passing through the exposure aperture of the shutter when the light intercepting layer is in alignment with the aperture.

In accordance with a still further characteristic feature of the present invention, the light receiving window of each shutter sector may be provided at its peripheral portion with a thin light receiving aperture defining layer of the same material as that of the printed electric coil, which is formed simultaneously with formation of the printed electric coil(s) and the wear-resisting layers by one and the same forming process and which projects slightly inwardly beyond the peripheral edge portion of the window thereby preventing scattered light from being generated due to the diffused reflection of the scene light which might occur when the scene light is directly incident to the inner wall of the light receiving window of each shutter sector made of a plastic material and, hence, having a relatively large thickness in order to obtain a suitable mechanical strength.

BRIEF DESCRIPTION OF THE DRAWINGS

FIG. 6 is a fragmentary plan view showing the configuration of the light intercepting layer and the light receiving aperture defining edge layer capable of being formed on the shutter sector of the shutter shown in FIGS. 1, 4 and 5;

FIG. 7 is a fragmentary cross-sectional view showing the pair of shutter sectors along line II—II in FIG. 1, wherein printed electric coils, the light intercepting layers and the light receiving aperture defining edge layers formed on the shutter sectors;

FIG. 8 is a fragmentary plan view showing the main portions of another embodiment of the electromagnetic shutter of the present invention;

DETAILED DESCRIPTION OF THE PREFERRED EMBODIMENTS

Figure 1:
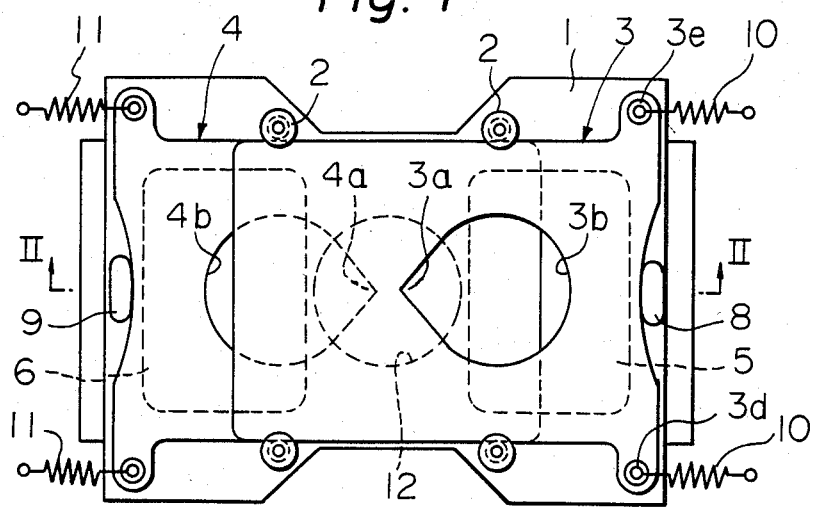
FIG. 1 is a plan view showing the main portion of an embodiment of the electromagnetic shutter constructed in accordance with the present invention.
Figure 2:
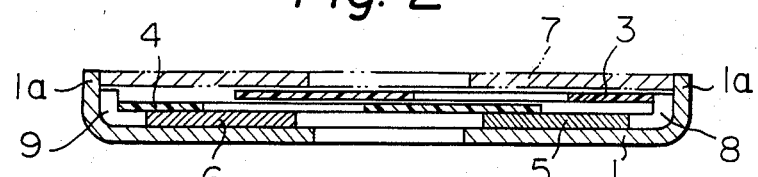
FIG. 2 is a cross-sectional view along the line II—II in FIG. 1.

With reference to FIGS. 1 and 2, the electromagnetic shutter shown comprises a lower magnetizable yoke 1 provided with guide rollers 2, a shutter sector 3 made of a plastic material such as epoxy resin with glass fibers embedded therein and preferably having a light intercepting property which is of the electrically insulating nature so that it serves as a base plate for a printed electric coil, a shutter sector 4 similar in configuration and physical property to the shutter sector 3 arranged in parallel to the shutter sector 3 in closely spaced relationship thereto but oriented in the reverse direction along the horizontal line, the shutter sectors 3 and 4 being rollingly guided at their upper and lower edges by the guide rollers so as to be reciprocally moved in the horizontal direction in FIG. 1, a pair of permanent magnets 5 and 6 secrued to the upper surface of the lower yoke 1 beneath the shutter sector 4 as shown, the permanent magnet 5 having the opposite polarity in the vertical direction in FIG. 2 to the permanent magnet 6, and an upper magnetizable yoke 7 located above the shutter sector 3 with both end edges thereof being connected to vertically upwardly bent lugs 1a, 1a formed at the respective ends of the lower yoke 1, each of the yokes 1 and 7 having an exposure aperture 12 for passing therethrough the scene light. The magnets 5, 6 are located in position by the positioning members 8, 9 attached to the bent lugs 1a, 1a, respectively, and the positioning members 8, 9 also serve as stoppers for limiting the movement of each shutter sector 3, 4 within the opened position and the closed position as described later. The magnetic circuit is completed along the permanent magnet 5— the yoke 7— the permanent magnet 6— the yoke 1— the permanent magnet 5.

The shutter sectors 3, 4 are provided with light receiving windows 3b, 4b in the tear-drop form having apexes 3a, 4a respectively, with the apexes 3a, 4a being oriented toward each other as shown. The size of each window 3b, 4b is substantially the same as the aperture 12 and the position of each window 3b, 4b is so determined that, when the sectors 3, 4 are located in the closed positions as shown in FIG. 1, i.e., when the sector 3 is in the right hand end with the right hand edge abutting against the member 8 and the sector 4 is in the left hand end with the left hand edge abutting against the member 9, the aperture 12 is completely covered by the sectors 3, 4 with the apexes 3a, 4a being spaced apart from each other, while, when the sector 3 is moved to the left and the sector 4 is moved to the right symmetrically with the movement of the sector 3, the apexes 3a, 4a are brought in alignment with each other so as to form a small light passing aperture at the center of the aperture 12 allowing the scene light to pass through the aperture 12. The size of the small aperture increases gradually as the sectors 3, 4 move further until they are stopped by the members 8, 9, respectively, at which positions the windows 3b, 4b are aligned with the aperture 12 so that fully opened aperture is achieved.

In order to urge the sector 3 to the closed position with the right hand edge abutting against the member 8, a pair of electrically conductive springs 10, 10 are provided, and one end each of the springs 10, 10 are provided, and one end each of the springs 10, 10 is connected to an electrically conductive pin 3e provided in the sector 3, while the other end each of the springs 10, 10 is connected to an electrically conductive pin provided at a suitable position in a base plate (not shown) of the shutter. In like manner, a pair of electrically conductive springs 11, 11 are provided in order to urge the sector 4 to the closed position.

In order to move the sector 3 from the closed position to the opened position against the action of the springs 10, printed electric coil 13 is provided on the sector 3 which is adapted to electromagnetically cooperate with the permanent magnet 5. In like manner, printed electric coil is provided on the sector 4 which is identical with the printed electric coil 13. Therefore, it suffices to describe the printed electric coil 13 for the understanding of the printed electric coil on the sector 4.

Figure 3:
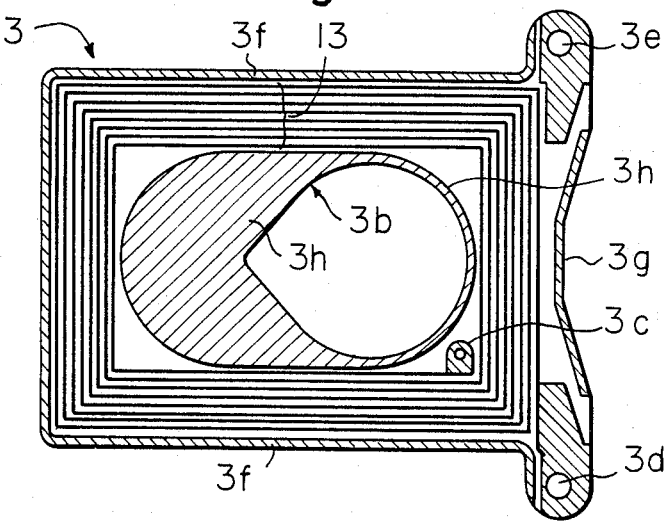
FIG. 3 is a plan view showing the construction of one of the pair of shutter sectors incorporated in the shutter shown in FIG. 1.

As shown in FIG. 3, the printed electric coil 13 is formed by effecting vacuum evaporation or sticking of a foil of metal such as copper entirely on one or both surfaces of the sector 3 and thereafter applying etching process to the foil for forming the required configuration of the coil 13. When the coil is formed on both surfaces, one end of the coil on one surface is connected to an electrically conductive pin 3d which is connected through the sector 3 to one end of the coil on the other surface of the sector 3. The other end each of the coils on both surfaces is connected to the respective pin 3e. When the coil is formed only on one surface of the sector 3, each of the two ends of the coil is connected to the respective pin 3e.

In like manner, the printed electric coil on the sector 4 is connected to the respective springs 11, 11.

Thus, when electric current in the predetermined direction is supplied for a predetermined time period by a control circuit (not shown) to the printed electric coils on the sectors 3, 4 through the springs, 10, 10; 11, 11, electromagentic force is generated by the coil on each sector 3, 4 by virtue of the cooperation with each permanent magnet 5, 6, respectively, so that the sectors 3, 4 are moved symmetrically toward each other to the opened positions, and, after the cutting-off of the electric current, the sectors 3, 4 are closed so that a required exposure is achieved. When the electric current is cut off before the sectors 3, 4 do not reach their fully opened positions, the shutter sectors 3, 4 commence the closing operation by the action of the springs 10, 10; 11, 11 so that the shutter operates as a programming shutter.

Figure 4:
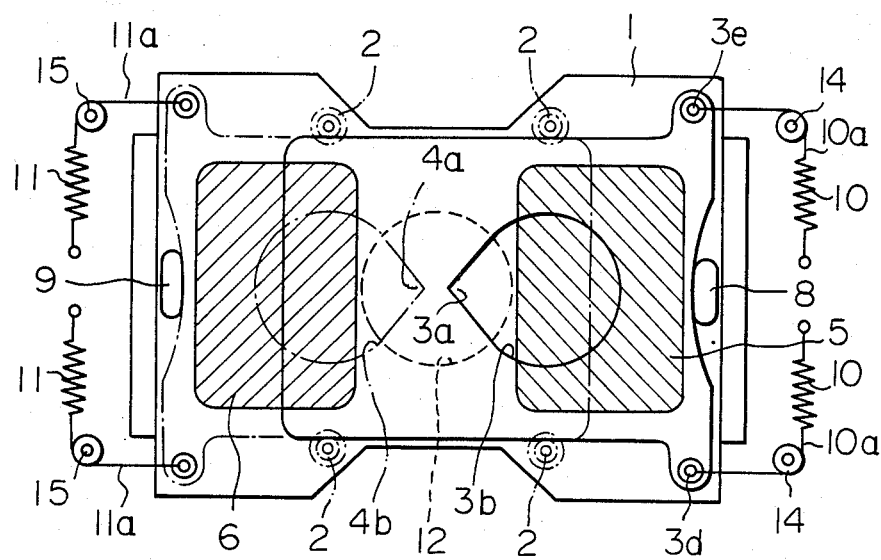
FIG. 4 is a plan view similar to FIG. 1 but showing an alternative embodiment of the electromagnetic shutter of the present invention.

FIG. 4 shows an alternative form of the shutter shown in FIG. 1. This shutter is generally identical with that shown in FIG. 1 except that electrically conductive slip rings 14, 14; 15, 15 are provided in the former and the straightened portion each of the springs 10, 10; 11, 11 adjacent to the pin 3e is slidably tensioned around the respective slip ring 14, 14; 15, 15 so that the electric current is supplied through the slip rings 14, 14; 15, 15 and the straightened portions of the springs 10, 10; 11, 11 to the respective electric coils on each sector 3, 4 without passing through the entire length of each spring 10, 10; 11, 11 so that the resistance of the springs in passing the electric current therethrough is greatly reduced. The operation of this shutter is similar to that of the shutter of FIG. 1.

Figure 5:
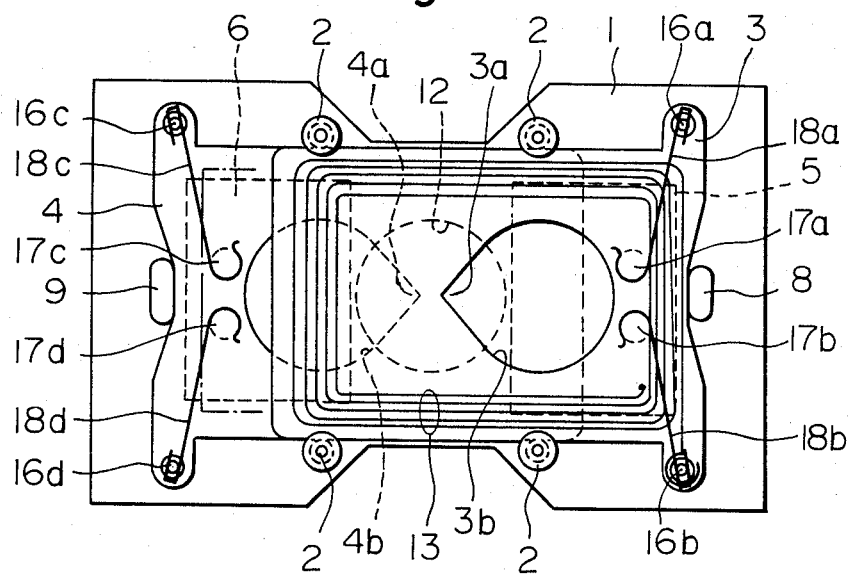
FIG. 5 is a plan view similar to FIG. 1 but showing a still further embodiment of the electromagnetic shutter of the present invention.

FIG. 5 shows a still further modified form of the shutter shown in FIG. 1. In this embodiment, the springs 18a, 18b are replaced for the springs 10, 10 in FIG. 1. One end of the spring 18a is fixedly secured to an electrically conductive spring supporting pin 16a while the other end is fixedly secured to an electrically conductive supporting pin 17a provided on an upper base plate (not shown) of the shutter so as to urge the sector 3 toward the right. In like manner, the spring 18b is secured at the respective ends to the pin 16b on the sector 3 and the pin 17b on the upper base plate so as to urge the sector 3 toward the right.

In like manner, a pair of springs 18c, 18d are provided which are secured at their one ends to the electrically conductive pins 16c, 16d on the sector 4 and at their other ends to the electrically conductive pins 17c, 17d on the upper base plate of the shutter so as to urge the sector 4 toward the left. The resistance of the springs 18a, 18b, 18c, 18d in passing the electric current is low and, therefore, efficient. The operation of the shutter is similar to that of the shutter of FIG. 1.

In accordance with the characteristic feature of the present invention, relatively sliding portions of the shutter are provided on both surfaces thereof with wear-resisting layers made of the same material as the printed electric coil 13, i.e. a metal such as copper which are formed simultaneously with the formation of the printed electric coil 13 by one are the same forming process. As shown in FIG. 3, the shutter sector 3, for example, is provided with wear-resisting layers 3f and 3g at the peripheral portion on both surfaces of the sector 3. The sector 4 is also formed with the wear-resisting layers similar to the wear-resisting layers 3f, 3g. Since the sectors 3, 4 are made of a plastic material and, hence, suffers from a relatively low wear-resisting property, the formation of the wear-resisting layers made of a foil of metal such as copper greatly improves the wear-resisting property of the sectors 3, 4 and, thus, the shutter can enjoy a longer effective life without deteriorating the accurate operation of the shutter.

In accordance with another characteristic feature of the present invention, a light intercepting layer is provided on a surface each of the sectors 3, 4 in order to perfectly intercept the scene light from passing through each sector 3, 4 when the same is held in the light intercepting position except the window 3b, 4b with respect to the aperture 12.

As shown in FIG. 3, the sector 3, for example, is formed around the window 3b with a light intercepting layer 3h of the generally elliptical form made of the same material as the printed electric coil 13 simultaneously with the formation of the printed electric coil 13 and the wear-resisting layers 3f, 3g by one and the same forming process. Thus, the accuracy of the operation of the shutter is greatly improved by avoiding any transmission of the scene light through the aperture to the photosensitive material when the sectors 3, 4 are in the closed positions.

In accordance with the still further characteristic feature of the present invention, a thin light receiving aperture defining layer 3b' having an apex 3a' of the same material as that of the printed electric coil 13 may be provided around the light receiving window 3b of shutter sector 3 simultaneously with the formation of the printed electric coil 13 by one and the same forming process. The light receiving aperture defining layer 3b' slightly projects inwardly beyond the inner wall of the window 3b as shown in FIG. 6 so as to define the light receiving aperture, thereby positively preventing the scene light incident to the shutter from being directly incident to the inner wall of the window 3b made of a plastic material and having a relatively large thickness so that the scattered light is positively avoided which might occur due to the diffused reflection when the scene light is incident to the inner wall of the window 3b.

A light receiving aperture defining layer 4b' similar to the layer 3b' is provided on the sector 4. The layer 3h' may be replaced for the layer 3h of the sector 3 for forming the layer 3b' when the light intercepting layer 3h is not provided. In like manner, a layer similar to the layer 3b' may be formed on the sector 4 when a light intercepting layer similar to the layer 3h is not provided. As shown in FIG. 7, the light intercepting layer 3h and the light receiving aperture defining layer 3b' of the sector 3 are preferably formed on the side of the sector 3 facing to the sector 4. In like manner, the light intercepting layer and the light receiving aperture defining layer of the sector 4 similar to those of the sector 3 are preferably formed on the side facing to the sector 3.

The light receiving aperture defining layer 3b' can be formed, for example, by first forming a foil of metal on one side of the sector as by the vacuum evaporation or the sticking of a foil of metal thereto, perforating the sector and the foil so as to form the light receiving window, then sticking a foil of metal entirely on the other side of the sector covering the light receiving window, and finally effecting an etching process to the foils of metal on both sides of the sector to thereby provide desired configurations of the printed electric coil on one side or on both sides of the sector and the light intercepting layer, if such is provided, as well as the light receiving aperture defining layer, if such is provided, the sticked foil being provided from the rearside or inside with an etching resisting layer preventing the foil from being etched out except the portion to be removed.

As described above, a superior wear-resisting property of the moving parts of the electromagnetic shutter, a superior light intercepting property of the shutter sectors made of a plastic material, and the positive scattered light obviating effect of the shutter sectors can be achieved by the simple construction of the electromagnetic shutter without necessitating undue troublesome processes.

Figure 9:
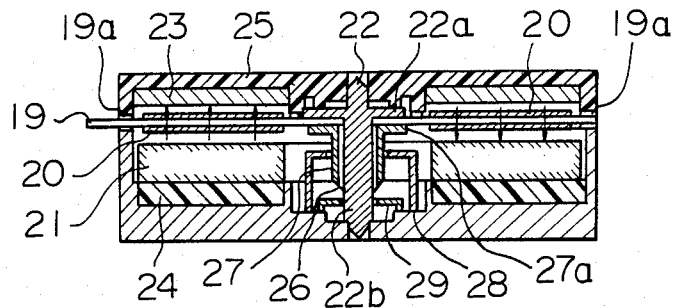
FIG. 9 is a cross-sectional view along a stright line passing through the axis of the pivot shaft of a shutter sector shown in FIG. 8, showing the construction of the driving mechanism.

FIG. 8 shows a further embodiment of the electromagnetic shutter of the present invention. In this embodiment, each shutter sector 19 is rotatably arranged on a shaft 22 fixedly secured to the sector 19 by its flange 22a (see FIG. 9) and rotatably fitted in the holes formed in the upper and lower wall of a case 25 located on the base plate in equally spaced relationship along a circle concentric with the aperture 12, the light intercepting portion of each sector 19 extending outwardly of the case 25 as shown in FIG. 9. Each sector 19 is formed on at least a surface thereof with the printed electric coil 20 concentric with the shaft 22 with which a multiple annular permanent magnet 21 concentric with the shaft 22 and vertically magnetized is electromagnetically cooperates. In order to complete the magnetic circuit of the permanent magnet 21, an upper magnetizable yoke 23 and a lower magnetizable yoke 24 are arranged in the case 25 as shown.

In order to supply electric current to the printed electric coil 20, a pair of slip rings 22b (formed by the lower portion of the shaft 22 per se) and 27 secured by its upper flange 27a to the sector 19 so as to be positioned concentrically around the shaft 22 and electrically insulated from the shaft 22 by an insulating sleeve 26 interposed therebetween, the slip ring 22b being electrically connected to one end of the coil 20 while the other end of the coil 20 is electrically connected to the slip ring 27. A pair of brushes 28 and 29 concentric with each other are secured to the inner surface of the lower wall of the case 25, and the brush 28 slidably and electrically contacts with the slip ring 27 while the brush 29 slidably and electrically contacts with the slip ring 22b. Thus, electric current can be supplied to the coil 20 through the pair of brushes 28, 29. When electric current in a predetermined direction is supplied to each of the coils 20 for a predetermined time period, an electromagnetic force is generated by each coil 20 so as to move each sector 19 to the opened position shown by the chain line. After the predetermined time period, electric current in the reversed direction is supplied to each coil 20 so that the sectors 19 are simultaneously moved toward the closed positions as shown in the solid line thereby completing the required exposure. Spring means for urging the sectors 19 to the closed positions may be provided instead of supplying the electric current in the reverse direction.

In order to move the respective sectors 19 in the synchronized state, a positioning pin 19b is provided on each sector 19 which, during the movement of each sector 19, slidingly contacts with an edge 19c of the adjacent sector as shown.

In accordance with the present invention, the wear-resisting layer 19a of the same material as that of the coil 20 is formed on the peripheral edge portion on both surfaces of each sector 19 simultaneously with the formation of the coil 20 by one and the same forming process.

Figure 10:
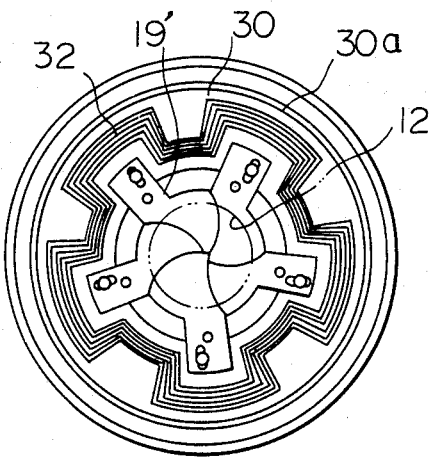
FIG. 10 is a plan view showing a still further embodiment of the electromagnetic shutter of the present invention.

FIG. 10 shows a still further embodiment of the electromagnetic shutter of the present invention. In this embodiment, a plurality of shutter sectors 19' are arranged in equally spaced relationship to each other along a circle concentric with the aperture and a rotatable sector ring 30 concentric with the aperture 12 is operatively coupled with each of the sectors 19' as by pin-slot engagement well known in the art that the sectors 19' can be opened and closed when the sector ring 30 is reciprocally rotated.

Figure 11:
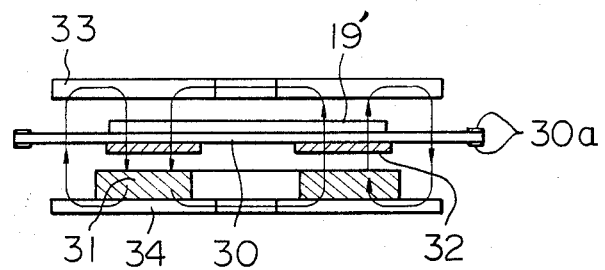
FIG. 11 is a schematic sectional view showing the magnetic circuit generated in the shutter shown in FIG. 10.

In order to actuate the sector ring 30, the printed electric coil 32 concentric with the aperture 12 is formed on at least a surface of the sector ring 30 which cooperates with an annular concentric permanent magnet 31 vertically magnetized as shown in FIG. 11 which illustrates the respective members in exploded state.

In orders to complete the magnetic circuit of the permanent magnet 31, magnetizable yokes 33, 34 are provided in like manner as in the case of the embodiment shown in FIG. 8.

The wear-resisting layer 30a is formed on the peripheral edge portion on both sides of the sector ring 30 instead of forming on the sectors 19' simultaneously with the formation of the coil 32 by one and the same forming process. Thus, the wear-resisting property of the sector ring 30 is improved.

What is claimed is:

1. In an electromagnetic shutter having an exposure aperture for passing light;
   a plurality of shutter sectors made of a plastic material and adapted to be opened from closed positions preventing light from passing through said aperture so that said aperture is uncovered to allow light to pass through said aperture and closed to said closed positions so as to complete an exposure by said shutter;

printed electric coil means operatively coupled with said shutter sectors;

permanent magnet means fixed in said shutter so as to cooperate with said printed electric coil means so that, when electric current is supplied in a predetermined direction to said printed electric coil means for a predetermined time period, an electromagnetic force is generated by said printed electric coil means by virtue of the cooperation thereof with said permanent magnet means to cause said shutter sectors to be opened for said predetermined time period and thereafter closed to complete a required exposure;

a mechanically relatively sliding portion movable with each said shutter sectors;

a wear-resisting layer made of the same material as that of said printed electric coil means simultaneously formed on said portion as said printed electric coil means;

a pair of said shutter sectors having substantially the same configuration and adapted to be moved symmetrically oppositely with respect to said aperture along a straight line passing through the center of said aperture and each formed with a light receiving window for passing therethrough the light when at least a portion of said window is brought in alignment with said aperture;

said printed electric coil means being formed on at least a surface of each of said shutter sectors and said wear-resisting layer being formed on the peripheral edge portion on both surfaces of each of said shutter sectors simultaneously with the formation of said printed electric coil means;

each of said shutter sectors being provided with a light intercepting layer of the same material as that of said printed electric coil means adjacent to said window on the surface of said shutter sector; and said light intercepting layer being formed simutaneously with the formation of said printed electric coil means and said wear-resisting layers by one and the same forming process and being of such a configuration that the same positively interrupt the light from passing through said aperture when said light intercepting layer is in alignment with said aperture.

2. An electromagnetic shutter as set forth in claim 1, wherein said printed electric coil means and said wear-resisting layers are formed by vacuum evaporation of metal.

3. An electromagnetic shutter as set forth in claim 1, wherein said printed coil means and said wear-resisting layers are formed from a foil of metal.

4. An electromagnetic shutter as set forth in claim 1, further comprising shutter sector closing spring means acting to normally urge said shutter sectors in said closed positions.

5. An electromagnet shutter as set forth in claim 1, wherein said shutter sectors are returned to said closed positions by supplying electric current to said printed coils in the reverse direction to the direction of the electric current supplied to said printed electric coils for opening said shutter sectors.

6. In an electromagnetic shutter having an exposure aperture for passing light;

a plurality of shutter sectors made of a plastic material and adapted to be opened from closed positions preventing light from passing through said aperture so that said aperture is uncovered to allow light to pass through said aperture and closed to said closed positions so as to complete an exposure by said shutter;

printed electric coil means operatively coupled with said shutter sectors;

permanent magnet means fixed in said shutter so as to cooperate with said printed electric coil means so that, when electric current is supplied in a predetermined direction to said printed electric coil means for a predetermined time period, an electromagnetic force is generated by said printed electric coil means by virtue of the cooperation thereof with said permanent magnet means to cause said shutter sectors to be opened for said predetermined time period and thereafter closed to complete a required exposure;

a mechanically relatively sliding portion moved with each said shutter sector;

wear-resisting layers made of the same material as that of said printed electric coil means simultaneously formed on said portion as said printed electric coil means;

a pair of shutter sectors having substantially the same configuration and adapted to be moved symmetrically oppositely with respect to said aperture along a straight line passing through the center of said aperture and each formed with a light receiving window for passing therethrough the light when at least a portion of said window is brought in alignment with said aperture;

said printed electric coil means being formed on at least a surface of each of said shutter sectors and said wear-resisting layer being formed on the peripheral edge of both surfaces of each of said shutter sectors simultaneously with the formation of said printed electric coil means;

said light receiving window of each shutter sector being provided at its peripheral portion with a thin light receiving aperture defining an edge layer of the same material as that of said printed electric coil, which projects slightly inwardly beyond the peripheral edge portion of said window thereby preventing scattered light from being generated due to the diffused reflection of the light which might occur when the light is incident directly to the inner wall of said light receiving window, said light receiving aperture defining an edge layer being formed simultaneously with the formation of said printed electric coil means and said wear-resisting layers by one and the same forming process.

7. An electromagnetic shutter as set forth in claim 6, wherein said printed electric coil means and said wear-resisting layers are formed by vacuum evaporation of metal.

8. An electromagnetic shutter as set forth in claim 6, wherein said printed electric coil means and said wear-resisting layers are formed from a foil of metal.

9. An electromagnetic shutter as set forth in claim 6, further comprising shutter sector closing spring means acting to normally urge said shutter sectors in said closed positions.

10. An electromagnetic shutter as set forth in claim 6, wherein said shutter sectors are returned to said closed positions by supplying electric current to said printed electric coils in the reverse direction to the direction of the electric current supplied to said printed electric coils for opening said shutter sectors.

11. In an electromagnetic shutter having an exposure aperture for passing light;

a plurality of shutter sectors made of a plastic material and adapted to be opened from closed positions preventing light from passing through said aperture so that said aperture is uncovered to allow light to pass through said aperture and closed to said closed positions so as to complete an exposure by said shutter;

printed electric coil means operatively coupled with said shutter sectors;

permanent magnet means fixed in said shutter so as to cooperate with said printed electric coil means so that, when electric current is supplied in a predetermined direction to said printed electric coil means for a predetermined time period, electromagnetic force is generated by said printed electric coil means by virtue of the cooperation thereof with said permanent magnet means to cause said shutter sectors to be opened for said predetermined time period and thereafter closed to complete a required exposure;

a mechanically relatively sliding portion movable with said shutter sectors;

a wear-resisting layer made of the same material as that of said printed electric coil means simultaneously formed on said portion as said printed electric coil means;

each of said shutter sectors being provided with a light receiving window and light intercepting layer of the same material as that of said printed electric coil means adjacent to said window on the surface of said shutter sector; and said light intercepting layer being formed simultaneously with the formation of said printed electric coil means and said wear-resisting layers by one and the same forming process and being of such a configuration that the same positively intercept the light from passing through said aperture when said light intercepting layer is in alignment with said aperture.

12. An electromagnetic shutter as set forth in claim 11, wherein:

said plurality of shutter sectors includes a pair of shutter sectors of substantially the same configuration arranged symmetrically to each other and adapted to be moved symmetrically oppositely with respect to said aperture along a straight line passing through the center of said aperture;

each of said pair of shutter sectors is formed with said light receiving window for passing therethrough the light when at least a portion of said window is brought into alignment with said aperture;

said light intercepting layer projecting slightly inwardly beyond the peripheral edge portion of said window thereby preventing scattered light from being generated due to the diffused reflection of the light which might occur when the light is incident directly to the inner wall of said light receiving window; and said light receiving aperture defining edge layer being formed simultaneously with the formation of said printed electric coil means and said wear-resisting layers by one and the same forming process.

13. An electromagnetic shutter as set forth in claim 12, wherein said printed electric coil means and said wear-resisting layers are formed by vacuum evaporation of metal.

14. An electromagnetic shutter as set forth in claim 12, wherein said printed electric coil means and said wear-resisting layers are formed from a foil of metal.

15. An electromagnetic shutter as set forth in claim 12, further comprising shutter sector closing spring means acting to normally urge said shutter sectors in said closed positions.

16. An electromagnetic shutter as set forth in claim 12, wherein said shutter sectors are returned to said closed positions by supplying electric current to said printed electric coils in the reverse direction to the direction of the electric current supplied to said printed electric coils for opening said shutter sectors.

17. An electromagnetic shutter as set forth in claim 11, wherein said printed electric coil means and said wear-resisting layers are formed by vacuum evaporation of metal.

18. An electromagnetic shutter as set forth in claim 11, wherein said printed electric coil means and said wear-resisting layers are formed from a foil of metal.

19. An electromagnetic shutter as set forth in claim 11, further comprising shutter sector closing spring means acting to normally urge said shutter sectors in said closed positions.

20. An electromagnetic shutter as set forth in claim 11, wherein said shutter sectors are returned to said closed positions by supplying electric current to said printed electric coils in the reverse direction to the direction of the electric current supplied to said printed electric coils for opening said shutter sectors.

* * * * *